United States Patent [19]

Krause

[11] 3,823,318

[45] July 9, 1974

[54] CIRCUIT ARRANGEMENT FOR EXPOSURE MEASURING DEVICES

[75] Inventor: Gerhard Krause, Ebersberg, Germany

[73] Assignee: Siemens Aktiengesellschaft, Berlin and Munich, Germany

[22] Filed: Jan. 10, 1973

[21] Appl. No.: 322,306

[30] Foreign Application Priority Data

Mar. 7, 1972 Germany............................ 2210945

[52] U.S. Cl. ............................ 250/214 P, 95/10 CT

[51] Int. Cl. ............................................ H01j 39/12

[58] Field of Search......... 95/10 CT, 10 CE, 10 CD, 95/10 C; 250/214 R, 214 P

[56] References Cited

UNITED STATES PATENTS

| | | | |
|---|---|---|---|
| 3,602,717 | 8/1971 | König | 95/10 CT |
| 3,620,143 | 11/1971 | Burgarella | 250/214 P |
| 3,626,825 | 12/1971 | Years | 250/214 |
| 3,659,509 | 5/1972 | Burgarella | 95/10 CT |
| 3,662,659 | 5/1972 | Metzger | 95/10 CD |
| 3,677,151 | 7/1972 | Werner | 95/10 CT |
| 3,679,905 | 7/1972 | Watanabe | 250/214 P |

*Primary Examiner*—James W. Lawrence
*Assistant Examiner*—D. C. Nelms
*Attorney, Agent, or Firm*—Hill, Gross, Simpson, Van Santen, Steadman, Chiara & Simpson

[57] ABSTRACT

Circuit arrangement for exposure measuring devices with a light detector operating as a photo element and measuring light conditions, which element is switched on at the initiation of a light measurement and operates into a load as well as an amplifier with a high-pass characteristic.

10 Claims, 2 Drawing Figures

CIRCUIT ARRANGEMENT FOR EXPOSURE MEASURING DEVICES

BACKGROUND OF THE INVENTION

1. Field of the Invention

This invention relates to a circuit arrangement for exposure measuring devices, and more particularly to a circuit arrangement for an exposure meter or automatic exposure control for cameras comprising a photo detector for measuring light conditions.

2. Description of the Prior Art

In circuit arrangements for exposure measuring devices it is possible to measure the exposure time required for the given light conditions and to indicate such conditions, or to directly and automatically adjust the required exposure time or the required aperture position, respectively, of a camera. The photo detector which measures the light conditions can thereby be arranged within a beam path which is entirely separate from the main beam path of the camera.

It is essential for the design of such a circuit that, on one hand, the light intensities available for the photo detector be very small (for example approximately $10^{-2}$ Lux) and that, on the other hand, temperature influences cannot cause any intolerable errors in measurement. Furthermore, the circuit arrangement must operate over a great range of exposure times, such as 1 millisecond up to 30 seconds.

If the photo detector were operated as a photo diode, the useful signal currents with the light intensities which can be considered would be in the order of picoamperes. On the other hand, however, the dark current will be in the order of nanoamperes, for example with a temperature of 60°C and a blocking voltage of 1 volt. For this reason, a direct evaluation of the diode current is excluded during blocking voltage operation. Also, this problem cannot be solved with circuit arrangements for compensating the dark current, in cases of such great current ratios.

If the photo detector is operated as a photo element, care must be taken that extensive forward currents will flow even with very small biases in the forward direction. This forward current subtracts from the photo current caused by the photons and will cause errors in measurement. Thereby, the forward current may be in the order of nanoamperes, for example with a forward voltage in the order of millivolts. These values can be linearly extrapolated in the direction of relatively small voltages. Therefore, the voltages may not exceed certain values at the photo element for a given permissible measuring error. The maximum admissible photo voltages at 60°C and an exposure strength of $10^{-2}$ Lux will be provided at 10 microvolts. The drift of operational amplifiers presently available is approximately 500 microvolts in the pertinent temperature range (−30...+60°C). The drift of field effect transistors related to the input is even greater. Therefore, the signal strength of 10 microvolts cannot be proven any longer with such amplifiers.

SUMMARY OF THE INVENTION

The present invention is based on the object of providing a circuit arrangement for exposure measuring devices whereby light measurements are possible even with fairly small light intensities.

The above object is achieved through the provision of a circuit arrangement of the type mentioned above in such a way that the photo detector operates as a photo element which is switched on approximately at the initiation of a measurement and that the photo detector works into a load and an amplifier having a high-pass characteristic.

BRIEF DESCRIPTION OF THE DRAWING

Other objects, features and advantages of the invention, its organization, construction and operation will best be understood from the following detailed description taken in conjunction with the accompanying drawings, on which.

DESCRIPTION OF THE PREFERRED EMBODIMENT

Figure 1:
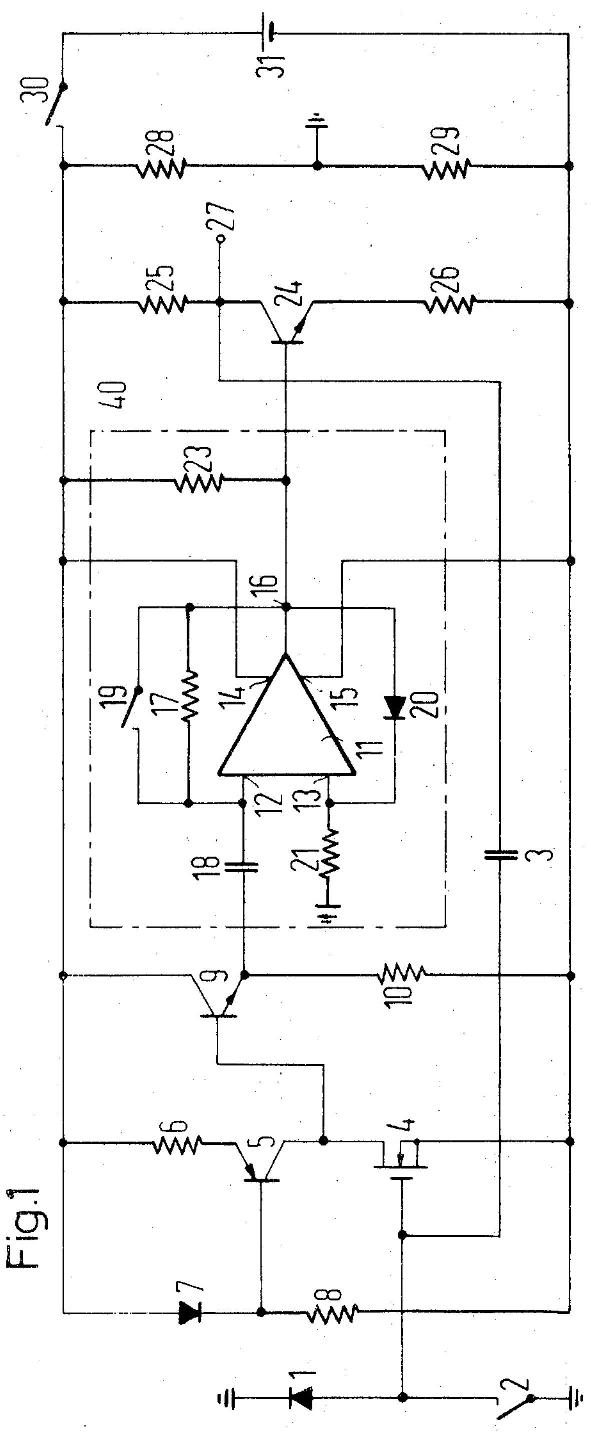
FIG. 1 is a schematic circuit diagram of a circuit arrangement for exposure measuring devices constructed in accordance with the principles of the present invention.

A circuit branch consisting of a photo diode 1 and a switch 2 connected in series therewith is connected at both ends to ground in the circuit arrangement according to FIG. 1. The switch 2 is operated to the closed condition shortly before or at the beginning of a light measurement. The junction between the photo diode 1 and the switch 2 is connected to the control electrode of a field effect transistor 4 and to a capacitor 3 which functions as a load. A loop consisting of a transistor 5, a resistor 6, a diode 7 and a resistor 8 represent the load for the field effect transistor 4 and is connected in the output circuit thereof. This load circuit for the field effect transistor 4 forms a current source which guarantees that a sufficiently large power resistance is realized for the field effect transistor in spite of the small voltage drop.

The field effect transistor 4 operates into an emitter follower stage including a transistor 9 having a resistor 10 connected between its emitter and one pole of a direct current source 31. Usually, an amplifier with a high-pass characteristic, referenced 40, is connected to and fed by the emitter follower stage.

The amplifier 40 comprises an operational amplifier 11 having an inverting input 12, a non-inverting input 13, voltage supply inputs 14 and 15 and an output 16. The operational amplifier 11 is coupled to the emitter follower transistor 9 by way of a capacitor 18. A feedback resistor 17 is connected from the output 16 of the operational amplifier 11 to the inverting input 12 and is connected in parallel with a switch 19. Furthermore, a diode 20 is connected between the output 16 and the non-inverting input 13 of the operational amplifier 11, the non-inverting input 13 being further connected to ground by way of a resistor 21. A resistor 23 is connected to the output 16 and functions as the load resistance for the operational amplifier.

The amplifier 40 operates into a transistor stage including a transistor 24 having a transistor 25 connected in the collector circuit and a resistor 26 connected in the emitter circuit. The output of this transistor stage is provided by way of the terminal 27 for the entire circuit to which the capacitor 3 is also connected.

The current supply for the circuit arrangement is effected by means of a battery 31 and a switch 30 having serially connected resistors 28 and 29 connected in parallel therewith, the junction point of the resistors being connected to ground to provide for symmetry of the operational voltage.

According to the invention, the aforedescribed circuit operates as follows. The photo diode 1 is constantly illuminated and is therefore illuminated before the trigger (not shown) is pressed. If the trigger is pressed the switch 30 will close to connect the supply battery to the above described amplifiers. At this time the switch 19 is also closed. A few milliseconds later, after the capacitors 3 and 18 have been charged to their steady state value, the switches 2 and 19 will open. Since the switch 2 is also closed shortly before or at the beginning of the measurement, the current supply by the photo diode 1 will charge the capacitor 3. Simultaneously, the voltage connected at the connection point of the photo diode 1 and the switch 2 will be amplified by the field effect transistor 4 and forwarded toward the capacitor 18 at the inverted input 12 of the operational amplifier 11 by way of the emitter follower transistor 9. The capacitor 18, together with the feedback resistor 17 of the operational amplifier 11, will form a high-pass filter whose boundary frequency is inversely proportional to the longest exposure time provided for in the particular construction. The emitter follower transistor 9 represents an impedance adapting stage and provides that the capacitor 18, after the operational voltage has been switched on, is charged within a very short period of time by way of the switch 30.

The output voltage of the operational amplifier 11, which is provided at the load resistor 23, will be connected to the opposite terminal of the capacitor 3. For this reason, a virtual capacitance value, which is equal to the product of the real value of this capacitor and the amplification factor of the amplifier will result for this capacitor.

If the signal at the output 16 of the operational amplifier 11 exceeds the threshold value of the diode 20—this is the case when a given photo current flows into the amplifier—the diode 20 will become conductive. In this case, a co-coupling onto the non-inverting input 13 of the operational amplifier 11 will occur so that its output voltage jumps to the maximum positive value.

With another embodiment of the exposure meter, a generator (not illustrated) positioned at the output 16 and supplying periodic oscillations will be connected with a pulse meter (also not shown) when the switch is opened. When the above-mentioned threshold value has been exceeded, the connection is broken again. The number of counted pulses is a measure of light intensity.

The transistor 24 provides the correct phase for the feedback voltage. If, for example, a lifting magnet for actuating the aperture of a camera is coupled to the output 27, the lifting magnet is actuated when the operational amplifier 11 flips when the threshold value of the diode 20 has been reached.

In a further development of the invention, a resistor may be provided in the place of the capacitor 3. In this case, the integrating effect of the capacitor will be taken over by the operational amplifier. For this purpose, a capacitor can be connected, for example, in parallel with the resistor 17.

Figure 2:
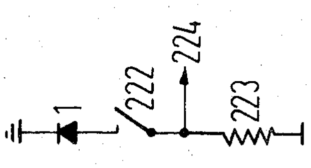
FIG. 2 is a variation of a portion of the circuit illustrated in FIG. 1.

It is furthermore not necessarily required to operate the photo diode 1 in a short circuit. According to FIG. 2 a resistor 223 may be connected in series with the photo diode 1. Then a switch 222 will be connected between a tap 224 and the photo diode 1, the tap 224 being connected to the control electrode of the field effect transistor 4.

The amplifier and the threshold value detector may also be separate functional units.

Although I have described my invention by reference to a specific illustrative embodiment thereof many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A circuit arrangement for exposure measuring devices of the type used in an exposure meter or in an automatic exposure device for a camera, comprising: a light sensitive device operable as a photo electric element; switching means for connecting said light sensitive device in a closed current path at the initiation of a light measurement; an amplifier circuit having an input and an output, said light sensitive device connected to said input of said amplifier circuit; and a load path connected to said light sensitive device and to said output, said amplifier circuit having a high-pass characteristic having a boundary frequency that is inversely proportional to the longest exposure time to be measured.

2. A circuit arrangement according to claim 1, wherein said switching means includes contacts connected to normally short circuit said light sensitive device until immediately prior to a measurement.

3. A circuit arrangement according to claim 1, wherein said switching means includes contacts operated to connect said light sensitive device and said amplifier circuit immediately prior to a measurement.

4. A circuit arrangement according to claim 1, wherein said load path includes a capacitor.

5. A circuit arrangement according to claim 1, wherein said load path includes a resistor.

6. A circuit arrangement according to claim 1, wherein said amplifier circuit includes an operational amplifier having an inverting input, a non-inverting input and an output, a capacitive coupling between said inverting input and said light sensitive device, a negative feedback connection between said output and said inverting input, and a threshold device connected between said output and said non-inverting input.

7. A circuit arrangement according to claim 1, comprising a field effect transistor having an input electrode connected to said light sensitive device, and an output electrode, and an impedance matching stage coupling said output electrode to said inverting input of said operational amplifier.

8. A circuit arrangement according to claim 7, comprising an active load connected to said output electrode of said field effect transistor.

9. A circuit arrangement according to claim 1, wherein said light sensitive device is a photo diode.

10. A circuit arrangement according to claim 9, wherein said switching means includes contacts connected to normally short circuit said photo diode until immediately prior to a measurement.

* * * * *